United States Patent Office 2,720,983
Patented Oct. 18, 1955

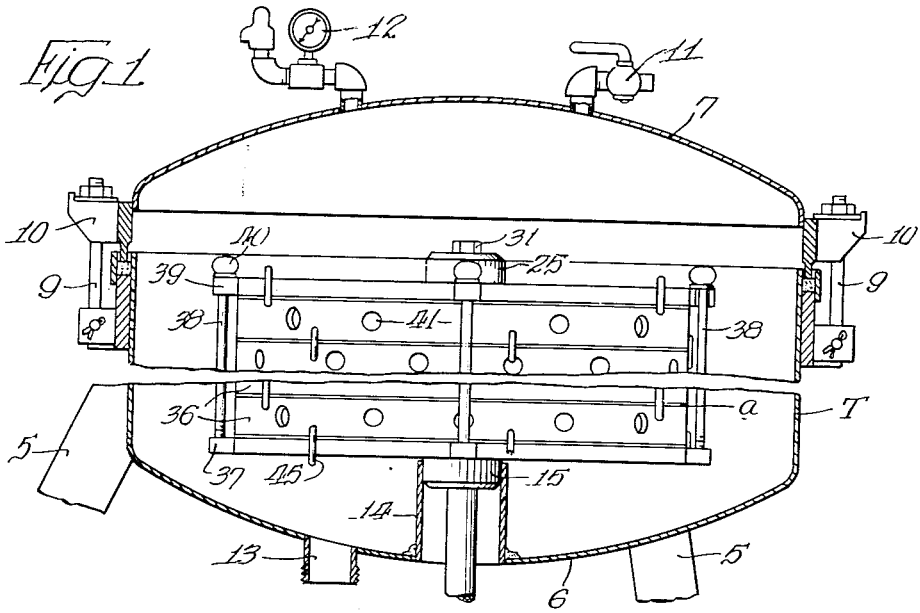

2,720,983

FILTER APPARATUS

Aloysius C. Kracklauer, Mundelein, Ill.

Application February 23, 1952, Serial No. 273,060

3 Claims. (Cl. 210—181)

This invention relates to a filter of the type in which a tank encloses one or more horizontal filter units through which liquid is circulated into a central column for gravity outflow therefrom. The present filter is designed primarily for industrial use, and is effective for the clarification of various liquids, and for the separation of solid particles contained in liquid vehicles which may be of many different kinds—acids, oils, syrups, wines varnishes, being examples.

The feature of improvement which characterizes the present filter is concerned primarily with the filter unit itself. It comprises a pair of metallic foraminous supporting discs for two overlying flexible filter sheets, together with the means assembled therewith by which to compress the outer marginal portions of the sheets upon opposite faces of the outer marginal portion of but one of the discs which is extended therebetween. In practice, it is found that a filter sheet will conform readily to the surface of a metallic disc against which it is pressed so as to establish a fluid-tight connection therewith. On the other hand, if two metallic discs be pressed one against the other, it is not possible to produce therebetween a connection which is fluid-tight in any comparable degree. For this reason filter units of the past have commonly employed supporting discs of lesser diameter than the associated sheets and interposed between the confronting faces of the outer marginal portions of the two sheets, radially outwardly of the supporting discs, a sealing ring to establish a satisfactory fluid seal at this point. The interposition of such a sealing ring adds to the number of parts involved in the assembly and also to the weight and expense of the filter unit. By the present invention I am able to dispense with any such sealing ring and yet provide adjacent the outer marginal portions of two metallic supporting discs a satisfactory seal which will meet all service requirements of the usual filter.

A suggestive embodiment of the invention is illustrated in the accompanying drawing wherein—

Figure 1 is a central vertical section through a conventional filter apparatus in its entirety;

Fig. 2 is an enlarged vertical sectional view through three operatively assembled superposed filter units which embody the improvements of this invention; and Fig. 3 is a fragmentary detail, in perspective, showing in vertical section the construction involved at the outer marginal portion of one of the filter units of this invention.

As herein illustrated, a cylindrical tank T is supported on legs 5 and provided with a downwardly dished bottom 6 and a removable dome top 7. Bolts 9 pivoted to the tank and engaging with lugs 10 outstanding from the top serve to secure the latter firmly in place. A valve-controlled vent 11 and a pressure-regulating gauge 12 are mounted on the top, as shown. Such a construction is common at the present time and needs no further description.

An inlet pipe 13 is connected to the tank bottom eccentrically thereof for delivery therethrough of the liquid which is to be filtered. The discharge opening of the tank is through an axial column 14 which is anchored to the bottom 6 and extended upwardly therefrom to mount at its upper end a base ring 15 wherein is a fixed cross bar 16.

The construction thus far described is concerned with a tank, its top, its inlet and its outlet. There remains to be considered the filter apparatus which operates within such a tank and which comprises essentially an assembly of superposed filter units, the lowermost one of which is rested on the base ring 15. These filter units of which the number is variable according to the size and capacity of the tank are interconnected as a unit, and since they are all alike a description of but one will suffice.

Referring to Fig. 2, each filter unit comprises a pair of metallic complementary annular plates A and B both of which are foraminated and formed with large central apertures. These plates are slightly coned and are arranged in confronting relation one with the other so as to provide a cone-shaped chamber therebetween. The inner marginal portion of each plate is disposed in a horizontal plane as is also the outer marginal portion $a$ of the plate B. The diameter of the other coacting plate A is slightly less so that its outer margin terminates inwardly of the horizontal outer marginal portion $a$ of its coacting plate.

Overlying each pair of complementary foraminous plates is a pair of annular filter sheets C and D, each having a diameter which is substantially equal to that of the larger supporting plate B so as to overlie its outer marginal portion $a$. The filter sheets are produced from suitable material, such as paper or a synthetic product having the requisite filtering properties. These sheets are flexible and readily deformable in response to compression. The sheet C overlying the smaller foraminous disc A will extend past its outer periphery to overlie the outer marginal portion $a$ of the other disc B on the face thereof which is opposite to that which is engaged by its associated filter sheet D (see Fig. 3).

One or more filter units answering to this description is mounted within the tank coaxially with the column 14. Over the topmost filter unit is fitted a cap 25, and between the inner marginal portions of the two supporting discs comprised in each filter unit is interposed an annular spacer ring 27 formed with radial ports 28 by which to establish communication with the chamber interiorly of each filter unit. The cylinder space interiorly of each annular spacer ring constitutes in effect a vertical extension of the column 14.

A tie bolt 30 is extended downwardly into the column through an opening in the cap on whose top face the bolt head 31 is rested. The lower end portion of the bolt is threaded to engage with a tapped hole in the cross bar 16. When so engaged, the axial tie bolt is rotatively advanced to compress the filter units in the region of their inner margins, and to fixedly lock the assembled structure within the tank.

A vertical support is also provided between the filter units adjacent their outer margins. This comprises a plurality of vertically spaced, axially aligned, compression rings 36, all alike and of the same diameter. The lowermost of these rings is equipped with lugs 37 having tapped holes each for reception of the threaded end of a bolt 38. Similar lugs 39 that are outwardly extended from the topmost compression ring 36 are apertured each to receive therethrough one of the bolts 38 whose head 40 is engaged with its top face. Between each pair of filter units is arranged one of the compression rings 36 formed therethrough with a plurality of radial ports 41. When assembled in place, the bolts 38 are rotatively advanced to compress the several rings axially, each with respect to the others, thereby to securely lock the outer marginal portions of the several filter units tightly together. To facilitate this assembly operation, the compression rings 36 are provided at spaced intervals with vertical guide pins 45 having oppositely protruding end portions. These end portions are so arranged as to engage the outer faces of the adjacent compression rings thereby assuring maintenance of a coaxial positioning of all compression rings in the several assembled filter units.

In the completed assembly the space between two adjacent compression rings 36 will be occupied by the outer marginal portion a of the supporting disc B and by the corresponding portions of two filter sheets C and D, arranged over opposite faces thereof. By this arrangement only one compression ring 36 is in engagement with the filter sheet D whose opposite face is engaged with the outer marginal portion a of the foraminous sheet B, the opposite face of the marginal portion a being engaged with the second filter sheet C whose opposite face is engaged by the next adjacent compression ring 36. In the axial compression which ensues responsive to tightening of the bolts 38, some deformation of the filter sheets will take place to attain conformity with the engaged metallic surfaces. As a result, fluid-tight connections are established at each such point. Metal to metal contact is avoided in the assembly and instead I employ an arrangement in which each metal compression ring engages with one face of a filter sheet whose opposite face is engaged with the marginal portion of one and the same supporting disc that is engaged by the second filter sheet in the same unit.

In use liquid entering through the inlet 13 ascends within the tank T well toward its top. It then passes inwardly through the ports 41 of the compression rings 36 to enter into the spaces between adjacent filter units where it is free to pass through the filter sheets into the interiors of the filter units and thence into the central column 14 for gravity outflow from the tank.

I claim:

1. A filter apparatus wherein is a chambered filter unit comprising a pair of annular flexible filter sheets of like outside diameter, a pair of annular foraminous discs in supporting engagement with the confroting faces of the filter sheets, the inside diameters of the discs being approximately the same as that of the sheets supported thereby, and the outside diameters of the discs being unequal with the larger of them substantially equal to the outside diameters of the filter sheets, circular spacer means separating the discs and sheets at their inner margins and formed with passages therethrough communicating with the chamber within the filter unit, a pair of compression rings having an outside diameter substantially equal to that of the larger disc and of the filter sheets and arranged coaxially thereof in engagement with the outer faces of the filter sheets and radially outwardly of the smaller disc whereby the outer marginal portions of but one supporting disc and of two filter sheets on its opposite faces intervene between the two compression rings, and screw means axially advancing one ring toward the other and compressing between them the outer marginal portions of the two filter sheets and of a single supporting disc therebetween to prevent fluid leakage therebetween.

2. A filter apparatus having a casing with an inlet and an outlet at opposite ends of a circulatory system comprising a plurality of intercommunicating filter units each made up of a pair of annular flexible filter sheets of like outside diameter, a pair of annular foraminous discs in supporting engagement with the confronting faces of the filter sheets, the inside diameters of the discs being approximately the same as that of the sheets supported thereby, and the outside diameters of the discs being unequal with the larger of them substantially equal to the outside diameters of the filter sheets, circular spacer means forming part of the circulatory system separating the discs and sheets at their inner margins and formed with passages therethrough communicating with the chamber within the filter unit, and a pair of compression rings having an outside diameter substantially equal to that of the larger disc and of the filter sheets and arranged coaxially thereof in engagement with the outer faces of the filter sheets and radially outwardly of the smaller disc whereby the outer marginal portions of but one supporting disc and of two filter sheets on its opposite faces intervene between the two compression rings, the several filter units being assembled in coaxial relation with the inner marginal portions of the filter sheets in interengagement, means compressing the several filter units axially to maintain pressure between each pair of interengaged filter sheets throughout their areas of contact to prevent fluid leakage therebetween, and other means compressing the several compression rings axially thereby to compress between them the outer marginal portions of the two filter sheets and of a single supporting disc therebetween to prevent fluid leakage at that point.

3. In a filter apparatus containing at least one filter unit recessed in a container for liquid, a filter unit comprising: a pair of similar flexible filter sheets; a pair of substantially similar foraminous plates in supporting engagement with the confronting faces of said filter sheets, one of said plates having larger outer dimensions than the other and having its outer marginal portion corresponding with the outer marginal portions of the filter sheets; a spacer separating the plates at their inner portions and having passages therethrough communicating with the closure between said plates; an outlet conduit in communication with said passages and in sealing engagement with the foraminous plates; means supporting said plates and filter sheets; and means compressing the filter sheets upon the outer marginal portion of the larger of the plates to prevent liquid leakage therebetween.

References Cited in the file of this patent

UNITED STATES PATENTS

| 1,475,577 | Green | Nov. 27, 1923 |
| 1,903,368 | Symons et al. | Apr. 4, 1933 |
| 2,088,199 | Gleason | July 27, 1937 |
| 2,278,453 | Kracklauer | Apr. 7, 1943 |
| 2,602,548 | Griffiths | July 8, 1952 |
| 2,615,574 | Kracklauer | Oct. 28, 1952 |
| 2,624,465 | Kracklauer | Jan. 6, 1953 |

FOREIGN PATENTS

| 512,972 | Great Britain | Sept. 29, 1939 |